United States Patent
Arbel et al.

(10) Patent No.: US 9,934,185 B2
(45) Date of Patent: Apr. 3, 2018

(54) PROCESSING SYSTEM NETWORK CONTROLLER WITH INTERFACE TO PROGRAMMABLE LOGIC

(71) Applicant: Xilinx, Inc., San Jose, CA (US)

(72) Inventors: Ygal Arbel, Morgan Hill, CA (US); Giulio Corradi, Munich (DE)

(73) Assignee: XILINX, INC., San Jose, CA (US)

(*) Notice: Subject to any disclaimer, the term of this patent is extended or adjusted under 35 U.S.C. 154(b) by 348 days.

(21) Appl. No.: 14/595,140

(22) Filed: Jan. 12, 2015

(65) Prior Publication Data

US 2016/0203096 A1 Jul. 14, 2016

(51) Int. Cl.
| | |
|---|---|
| G06F 13/38 | (2006.01) |
| G06F 13/40 | (2006.01) |
| G06F 13/42 | (2006.01) |
| G06F 3/00 | (2006.01) |
| G06F 13/28 | (2006.01) |

(52) U.S. Cl.
CPC .......... *G06F 13/4068* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 7,042,899 B1 * | 5/2006 | Vaida | H04L 49/109 370/429 |
| 7,142,557 B2 | 11/2006 | Dhir et al. | |
| 7,467,319 B1 | 12/2008 | Kao et al. | |
| 8,154,989 B1 | 4/2012 | Susai et al. | |
| 8,311,174 B1 | 11/2012 | Susai et al. | |
| 2005/0084076 A1 * | 4/2005 | Dhir | H04L 12/5692 379/55.1 |
| 2009/0257445 A1 * | 10/2009 | Chan | H04L 49/352 370/463 |

* cited by examiner

*Primary Examiner* — David E Martinez
(74) *Attorney, Agent, or Firm* — Robert M. Brush

(57) ABSTRACT

In an example, a programmable integrated circuit (IC) includes programmable logic, a processing system, and a network controller. The network controller includes a media access control unit (MAC), a first interface to a physical transceiver, a second interface to the processing system, and a third interface between the MAC and the programmable logic.

6 Claims, 5 Drawing Sheets

PROCESSING SYSTEM NETWORK CONTROLLER WITH INTERFACE TO PROGRAMMABLE LOGIC

TECHNICAL FIELD

Examples of the present disclosure generally relate to electronic circuits and, in particular, to providing an interface within a programmable integrated circuit (IC) between a network controller in a processing system and programmable logic.

BACKGROUND

Programmable integrated circuits (ICs) include programmable logic that can be configured to implement circuits according to user input. Example programmable ICs include field programmable gate arrays (FPGAs), complex programmable logic devices (CPLDs), and the like. Advancement in system-on-chip (SoC) technology has led to programmable ICs that include both an embedded processing system and programmable logic. The embedded processing system can include microprocessor(s), on-chip memory, and various peripherals. Each peripheral in the embedded processing system includes a dedicated circuit to perform a particular function, such as a display controller, network controller, universal serial bus (USB) controller, and the like.

In general, a peripheral can provide an interface between a connected device and the processing system. For example, an Ethernet controller can provide an interface between a physical Ethernet transceiver and the processing system. On the processing system side, a peripheral can communicate with system memory to store data received from a connected device and retrieve data to be transmitted to a connected device. Since the system memory is managed by the processing system, the peripheral cooperates with a microprocessor to access data therein. In some applications, such microprocessor intervention introduces undesirable latency when using the peripheral.

SUMMARY

Techniques are described for providing an interface within a programmable integrated circuit (IC) between a network controller in a processing system and programmable logic. In an example, a programmable integrated circuit (IC) includes programmable logic, a processing system, a network controller. The network controller includes a media access control unit (MAC), a first interface to a physical transceiver, a second interface to the processing system, and a third interface between the MAC and the programmable logic.

In another example, a system includes a first Ethernet physical transceiver and a programmable integrated circuit coupled to the first physical transceiver. The programmable IC includes programmable logic, a processing system, and a first network controller. The processing system includes an input/output (IO) circuit coupled to the first Ethernet physical transceiver, a microprocessor, a memory controller coupled to manage a memory, and a bus coupled to the memory controller. The first network controller includes a first Ethernet media access control unit (MAC), a first bus interface to the bus, and a first direct interface to the programmable logic, the first Ethernet MAC including a media independent interface (MII) coupled to the IO circuit and a client interface coupled to the first bus interface and the first direct interface.

In another example, a method includes controlling a network controller in a processing system of a programmable integrated circuit (IC) to couple a client interface of a media access control unit (MAC) to programmable logic of the programmable IC; and configuring a circuit in the programmable logic coupled to the client interface to process a data stream without intervention by a microprocessor in the processing system.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Techniques are described for providing an interface within a programmable integrated circuit (IC) between a network controller in a processing system and programmable logic. The network controller includes a media access control unit (MAC) that communicates with a network transceiver over a standard interface. An example network controller is an Ethernet controller. For example, the network controller can include an Ethernet MAC that communicates with an Ethernet physical transceiver using a media independent interface (MII), such as a gigabit MII (GMII), reduced gigabit MII (RGMII), serial gigabit MII (SGMII), or the like. On the client side, the network controller can communicate with system memory through a buffer (e.g., a first-in-first-out (FIFO) circuit) using a direct memory access (DMA) function that can directly access system memory over a bus in the processing system. In addition, the network controller includes a direct interface between the MAC and programmable logic in the programmable IC. In this manner, the programmable logic has direct access to a client interface of the MAC. The network controller can be programmed to use the DMA interface, the direct interface to the programmable logic, or a combination of both.

In an example, a circuit can be configured in the programmable logic and be coupled to the direct interface to the MAC of the network controller. The circuit can access the packet stream being processed by the MAC through the direct interface. The circuit can process the packet stream in real-time and without microprocessor intervention. The direct interface between the programmable logic and the MAC allows for implementation of time-sensitive applications, such as control applications that use a precision timing protocol (PTP) for time synchronization. These and further aspects are described below.

Figure 1:
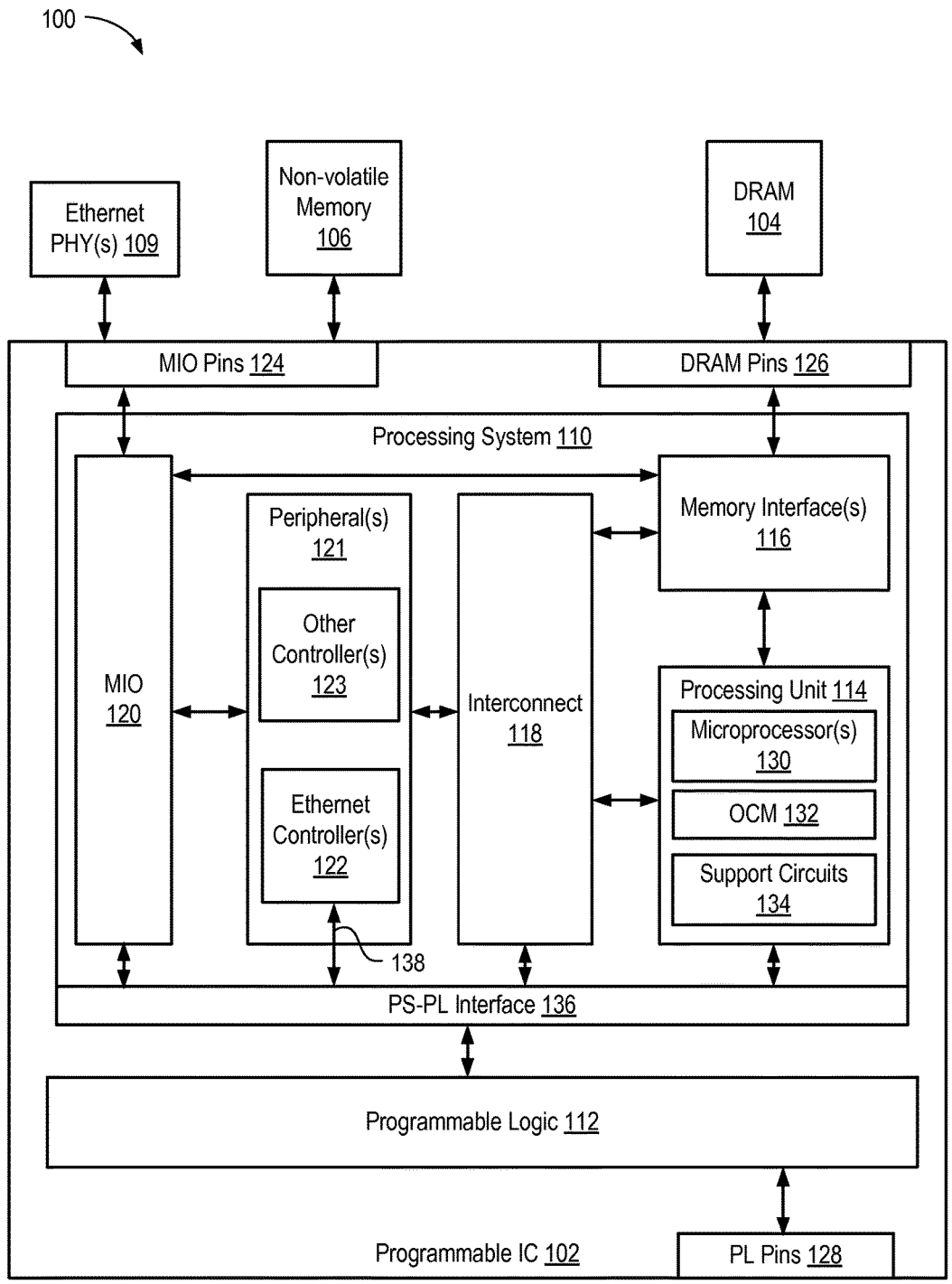
FIG. 1 is a block diagram depicting an example of a programmable system.

Turning now to the figures, FIG. 1 is a block diagram depicting an example of a programmable system 100. The programmable system 100 includes a programmable integrated circuit (IC) 102. The programmable IC 102 may be coupled to various circuits, such as a dynamic random access memory (DRAM) 104, non-volatile memory 106, and Ethernet physical layer (PHY) transceiver(s) 109, among other circuits. The DRAM 104 can include various types of volatile memory circuits, such as synchronous DRAM, double data rate synchronous DRAM, and the like. The non-volatile memory 106 can include various types of non-volatile memory circuits, such as FLASH memory, electrically erasable programmable read only memory (EEPROM), and the like. Each of the Ethernet PHY transceiver(s) 109 comprises a circuit coupled to physical media (not shown) that transmits and receives signals as defined for the physical layer of an IEEE 802.3 standard for Ethernet.

The programmable IC 102 can include a processing system 110 (also referred to as PS 110) and programmable logic 112 (also referred to as PL 112). The programmable IC 102 can include a system on chip (SoC) that integrates a microprocessor-based processing system with programmable logic of a field programmable gate array (FPGA), complex programmable logic device (CPLD), or the like. The processing system 110 can be coupled to various input/output (IO) pins of the programmable IC 102, including multiplexed IO (MIO) pins 124 and DRAM pins 126. The Ethernet PHY transceiver(s) 109 can be coupled to the MIO pins 124, and the DRAM 104 can be coupled to the DRAM pins 126. The programmable logic 112 can be coupled to programmable logic (PL) pins 128.

The processing system 110 can include a processing unit 114, one or more memory interfaces (memory interface(s) 116), interconnect 118, one or more peripherals (peripheral(s) 121), an MIO circuit (MIO 120), and a PS-PL interface 136, among other components. The processing unit 114 can be coupled to the memory interface(s) 116. The memory interface(s) 116 can include DRAM memory controllers, non-volatile memory controllers, and the like. The memory interface(s) 116 can be coupled to the DRAM pins 126 to communicate with the DRAM 104 (e.g., system memory for the processing system 110). The processing unit 114, the memory interface(s) 116, and the peripheral(s) 121 can be coupled to the interconnect 118. The interconnect 118 can include busses, switches, ports, and the like to facilitate connection between components of the processing system 110.

The peripheral(s) 121 and the memory interface(s) 116 can also be coupled to the MIO 120, which is in turn coupled to the MIO pins 124. The peripheral(s) 121 can communicate with other circuits through the MIO 120. The memory interface(s) 116 can communicate with the non-volatile memory 106 through the MIO 120. The MIO 120 multiplexes interfaces of the peripheral(s) 121 and the memory interface(s) 116 among the MIO pins 124. The peripheral(s) 121, MIO 120, the interconnect 118, and the processing unit 114 can be coupled to the PS-PL interface 136 for communicating with the programmable logic 112.

The processing unit 114 includes one or more microprocessors (microprocessor(s) 130), on-chip memory (OCM) 132, and support circuits 134. The microprocessor(s) 130 can include any type of microprocessors known in the art. The OCM 132 can include cache memory, local memory, or the like. The support circuits 134 can include various types of circuits, such as interrupt controller(s), direct memory access (DMA) controllers, timers, registers, interconnect, cache controllers, and the like.

Figure 2:
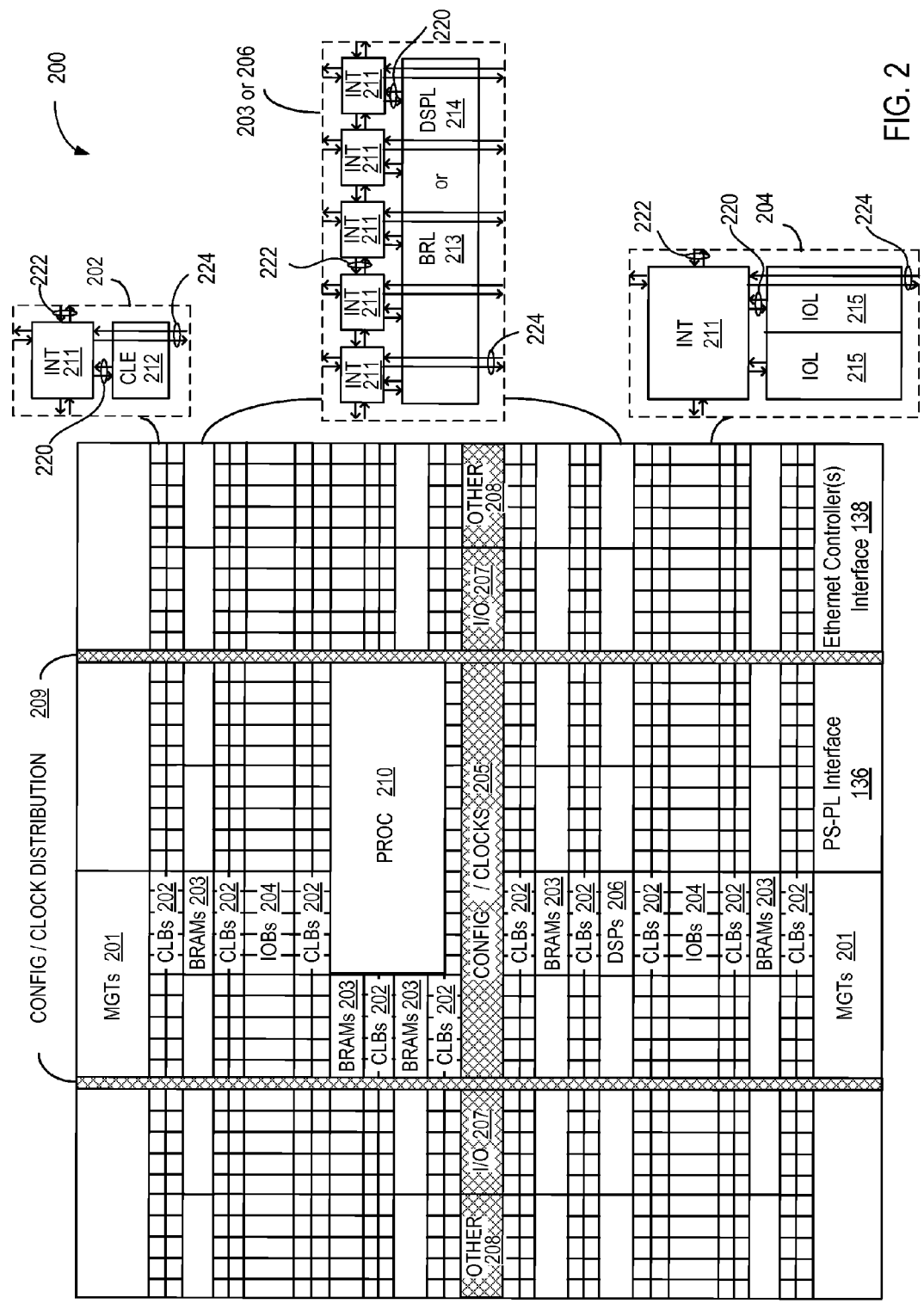
FIG. 2 illustrates an example of a field programmable gate array (FPGA) that can be used as programmable logic in the programmable system of FIG. 1.

The processing system 110 is coupled to the programmable logic 112 through the PS-PL interface 136. An example of the programmable logic 112 is shown in FIG. 2 and described below. The programmable logic 112 can communicate with the processing unit 114, the memory interface(s) 116, the MIO 120, and the peripheral(s) 121 of the processing system 110. For example, the programmable logic 112 can interrupt the processing unit 114, access memory through the memory interface(s) 116 or within the processing unit 114, and access the peripheral(s) 121.

In an example, the peripheral(s) 121 include Ethernet controller(s) 122 and optionally other controller(s) 123. The other controller(s) 123 can include, for example, universal serial bus (USB) controller(s), display controller(s), non-volatile memory controller(s), serial bus controller(s), and the like. The peripheral(s) 121 are "hardened" in that they include dedicated circuitry for performing a particular function, rather than being configured in the programmable logic 112. Each of the Ethernet controller(s) 122 includes an MII interface and client interface (shown in FIG. 3). The MII interface provides a standard Ethernet interface for use with an Ethernet PHY transceiver. The client interface receives a data stream as input and provides a data stream as output. The data stream input to the client interface is formatted and transmitted through the MII interface ("transmit data stream"). The data stream output from the client interface is recovered from data received through the MII interface ("receive data stream").

Each of the Ethernet controller(s) 122 can operate in multiple modes. In a first mode, the client interface is coupled to communicate with the processing system 110. As described below, the client interface can communicate with the processing system 110 using a DMA function to store data in system memory or obtain data from system memory (e.g., the DRAM 104). The first mode cooperates with software executing on the processing unit 114 to manage data in the system memory. In a second mode, the client interface is coupled to communicate with the programmable logic 112. Each of the Ethernet controller(s) 122 includes a direct interface 138 to the programmable logic 112. The direct interface 138 of each of the Ethernet controller(s) 122 is part of the PS-PL interface 136. The direct interface 138 allows circuit(s) in the programmable logic 112 to access transmit and receive data streams on the client interface directly and without intervention by the processing unit 114.

While various examples are described with respect to the Ethernet protocol, the techniques of providing a direct interface between a processing system based network controller and programmable logic are applicable to other types of network protocols. In general, a programmable IC can include a processing system and programmable logic, where the processing system includes a network controller peripheral. The network controller peripheral can include a direct interface to the programmable logic that can be used by the programmable logic without intervention by microprocessor(s) in the processing system.

FIG. 2 illustrates an example of a field programmable gate array (FPGA) 200 that can be used as the programmable logic 112. The FPGA 200 includes a programmable fabric that includes a large number of different programmable tiles including multi-gigabit transceivers ("MGTs") 201, configurable logic blocks ("CLBs") 202, random access memory blocks ("BRAMs") 203, input/output blocks ("IOBs") 204, configuration and clocking logic ("CONFIG/CLOCKS") 205, digital signal processing blocks ("DSPs") 206, specialized input/output blocks ("I/O") 207 (e.g., configuration ports and clock ports), and other programmable logic 208 such as digital clock managers, analog-to-digital converters, system monitoring logic, and so forth. Some FPGAs can also include dedicated processor blocks ("PROC") 210.

In some FPGAs, each programmable tile can include at least one programmable interconnect element ("INT") 211 having connections to input and output terminals 220 of a programmable logic element within the same tile, as shown by examples included at the top of FIG. 2. Each programmable interconnect element 211 can also include connections to interconnect segments 222 of adjacent programmable interconnect element(s) in the same tile or other tile(s). Each programmable interconnect element 211 can also include connections to interconnect segments 224 of general routing resources between logic blocks (not shown). The general routing resources can include routing channels between logic blocks (not shown) comprising tracks of interconnect segments (e.g., interconnect segments 224) and switch blocks (not shown) for connecting interconnect segments. The interconnect segments of the general routing resources (e.g., interconnect segments 224) can span one or more logic blocks. The programmable interconnect elements 211 taken together with the general routing resources implement a programmable interconnect structure ("programmable interconnect") for the illustrated FPGA. Each programmable interconnect element 211 can include an interconnect circuit that can implement various types of switching among input interconnect segments and output interconnect segments, such as cross-point switching, break-point switching, multiplexed switching, and the like.

In an example, a CLB 202 can include a configurable logic element ("CLE") 212 that can be programmed to implement user logic plus a single programmable interconnect element ("INT") 211. A BRAM 203 can include a BRAM logic element ("BRL") 213 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 206 can include a DSP logic element ("DSPL") 214 in addition to an appropriate number of programmable interconnect elements. An 10B 204 can include, for example, two instances of an input/output logic element ("IOL") 215 in addition to one instance of the programmable interconnect element 211. As will be clear to those of skill in the art, the actual I/O pads connected, for example, to the I/O logic element 215 typically are not confined to the area of the input/output logic element 215.

In the pictured example, a horizontal area near the center of the die (shown in FIG. 2) is used for configuration, clock, and other control logic. Vertical columns 209 extending from this horizontal area or column are used to distribute the clocks and configuration signals across the breadth of the FPGA.

Some FPGAs utilizing the architecture illustrated in FIG. 2 include additional logic blocks that disrupt the regular columnar structure making up a large part of the FPGA. The additional logic blocks can be programmable blocks and/or dedicated logic. For example, processor block 210 spans several columns of CLBs and BRAMs. The processor block 210 can include one or more hard microprocessors and/or one or more soft microprocessors. The processor block 210 is optional. If the processor block 210 is present, such processor block 210 in provided in addition to the microprocessors 130.

The FPGA 200 also includes the PS-PL interface 136, which includes the Ethernet controller(s) interface 138. The interface 138 can be coupled to the routing resources described above, allowing circuit(s) configured in the FPGA 200 to access the client interface of each of the Ethernet controller(s) 122 without microprocessor intervention.

Note that FIG. 2 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 2 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA. Moreover, the FPGA of FIG. 2 illustrates one example of a programmable IC that can employ examples of the interconnect circuits described herein. The interconnect circuits described herein can be used in other types of programmable ICs, such as complex programmable logic devices (CPLDs) or any type of programmable IC having a programmable interconnect structure for selectively coupling logic elements.

Figure 3:
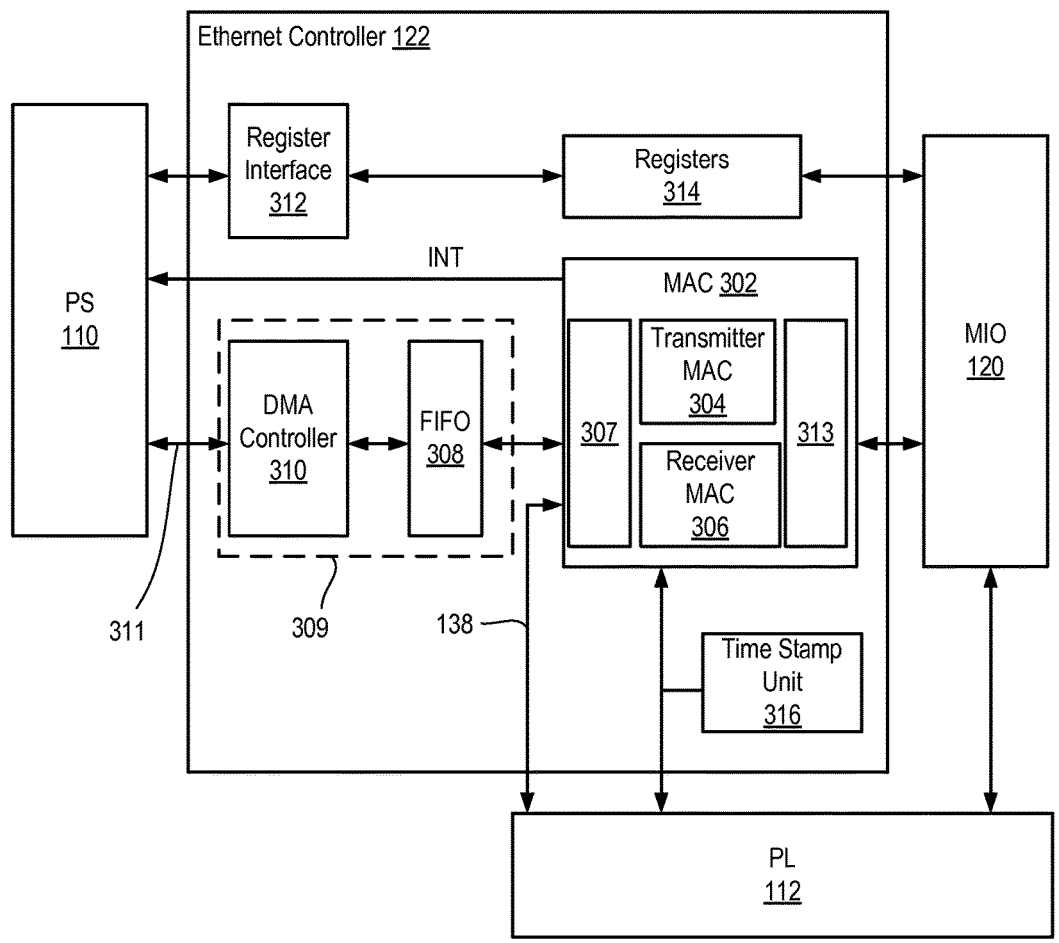
FIG. 3 is a block diagram depicting an example of an Ethernet controller.

FIG. 3 is a block diagram depicting an example of an Ethernet controller 122. The Ethernet controller 122 includes a bus interface 309, a register interface 312, registers 314, and a media access control unit (MAC) 302. The MAC 302 includes a transmitter MAC 304, a receiver MAC 306, an MII interface 313, and a client interface 307. The bus interface 309 can include a direct memory access (DMA) controller 310 and a first-in-first-out (FIFO) circuit 308. The bus interface 309 is coupled to the client interface 307 of the MAC 302 and provides access to the PS 110 over a bus 311 in the interconnect 118. The register interface 312 is coupled to the registers 314 and provides access to the PS 110 over another bus in the interconnect 118. The registers 314 are coupled to the MIO 120 to provide status/control signals. The MII interface 313 of the MAC 302 is coupled to the MIO 120 to provide a standard Ethernet interface (e.g., GMII, RGMII, SGMII, etc.). The client interface 307 is also coupled to the PL 112 via the direct interface 138. The MAC 302 can also include an interrupt interface (INT) to the processing system 110 for generating interrupts. In some examples, the Ethernet controller 122 can include a time stamp unit 316 for use in implementing a precision timing protocol (PTP), such as the IEEE1588 protocol for time synchronization. An interface of the time stamp unit 316 is coupled to the MAC 302. The interface of the time stamp unit 316 can also be coupled to the PL 112.

Various options of the Ethernet controller 122 can be set by storing values in the registers 314 through the register interface 312. In an example, one or more locations in the registers 314 control which of the bus interface 309 and/or the direct interface 138 is coupled to the client interface 307. The client interface 307 can be selectively coupled to the bus interface 309, the direct interface 138 to the programmable logic 112, or both the bus interface 309 and the direct interface 138 to the programmable logic 112.

Figure 4:
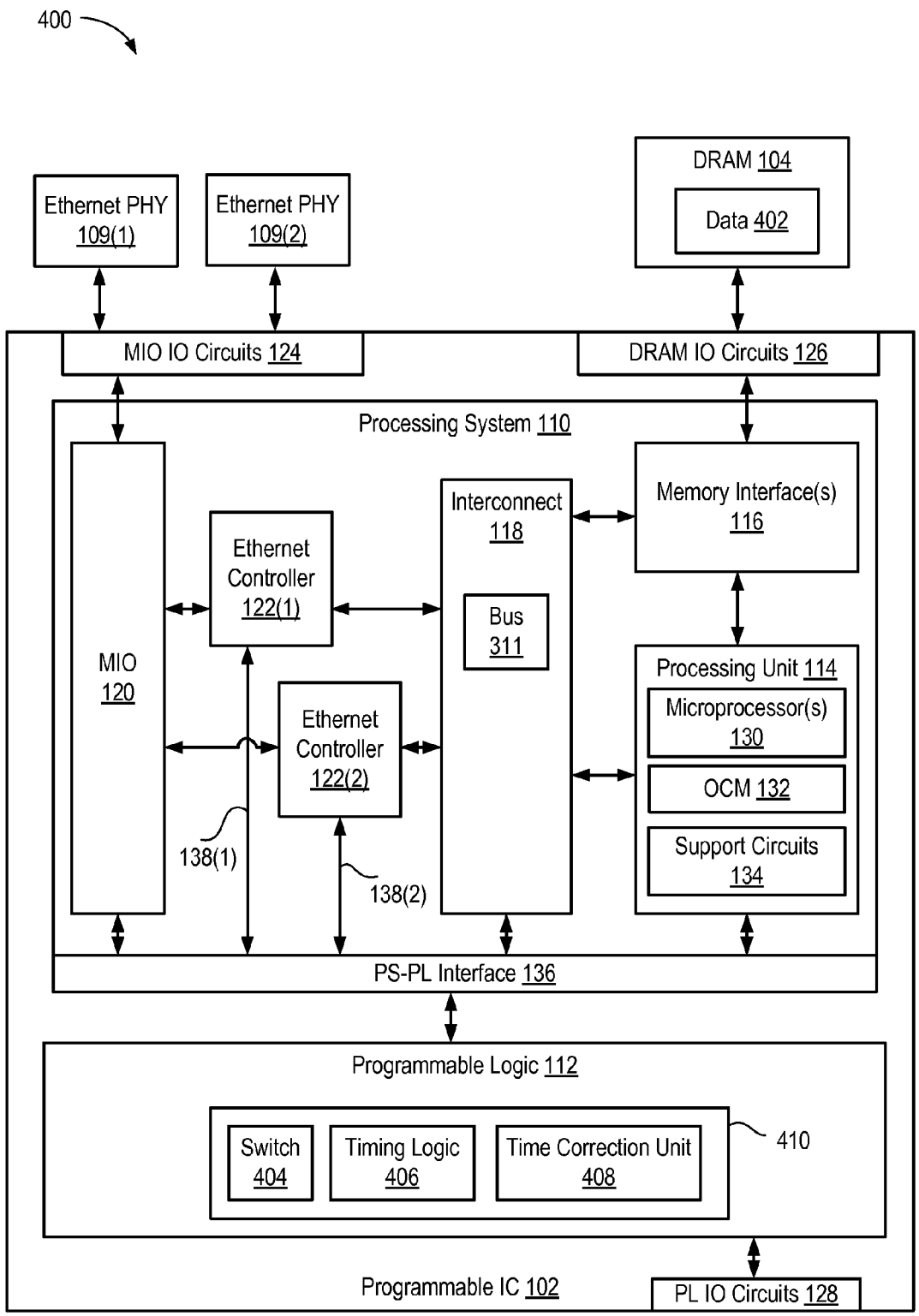
FIG. 4 is a block diagram showing an example configuration of the programmable system of FIG. 1.

FIG. 4 is a block diagram showing an example configuration 400 of the programmable system 100 of FIG. 1. In the example, the processing system 110 includes two Ethernet controllers 122(1) and 122(2) with direct interfaces 138(1) and 138(2) to the programmable logic 112, respectively. The programmable IC 102 is coupled to two Ethernet PHY transceivers 109(1) and 109(2). The programmable logic 112 includes a circuit 410 configured therein. The circuit 410 is configured to be coupled to the direct interfaces 138(1) and 138(2) of the Ethernet controllers 122(1) and 122(2). The circuit 410 can process data streams on client interfaces of the Ethernet controllers 122(1) and 122(2) without intervention by the microprocessor(s) 130. This reduces latency, which is useful for various real-time applications. The Ethernet controllers 122(1) and 122(2) can also access data 402 in the DRAM 104 using a DMA function, as discussed above.

For example, the circuit 410 can include a switch 404, timing logic 406, and a time correction unit 408. The switch 404 is coupled to the direct interfaces 138(1) and 138(2). The switch 404 can direct a data stream from one of the Ethernet controllers 122(1) and 122(2) to the other. For example, data can be routed from the Ethernet PHY 109(1), through the Ethernet controller 122(1), through the switch 404, and through the Ethernet controller 122(2) to the Ethernet PHY 109(2). The switch 404 can also direct a data stream from one of the Ethernet controllers 122(1) and 122(2) to the programmable logic 112 (e.g., another circuit configured in the programmable logic 112). For example, data can be routed from the Ethernet PHY 109(1), through the Ethernet controller 122(1), and through the switch 404 to the timing logic 406 and/or the time correction unit 408. The timing logic 406 can be coupled to the switch 404 to implement a PTP, such as that defined in IEEE 1588. For example, the timing logic 406 can implement a transparent clock of a PTP. The time correction unit 408 can correct time stamps in PTP messages for the propagation time through the programmable IC 102 as required by the transparent clock function of the PTP. Implementation of a PTP is one example of a real-time application that can benefit from direct interfaces to network controller peripherals in the processing system 110. The switch 404 can also direct a data stream from the programmable logic 112 to one of the Ethernet controllers 122(1) and 122(2). For example, data can be routed from the timing logic 406 and/or the time correction unit 408, through the switch 404, and through the Ethernet controller 122(2) to the Ethernet PHY 109(2).

Figure 5:
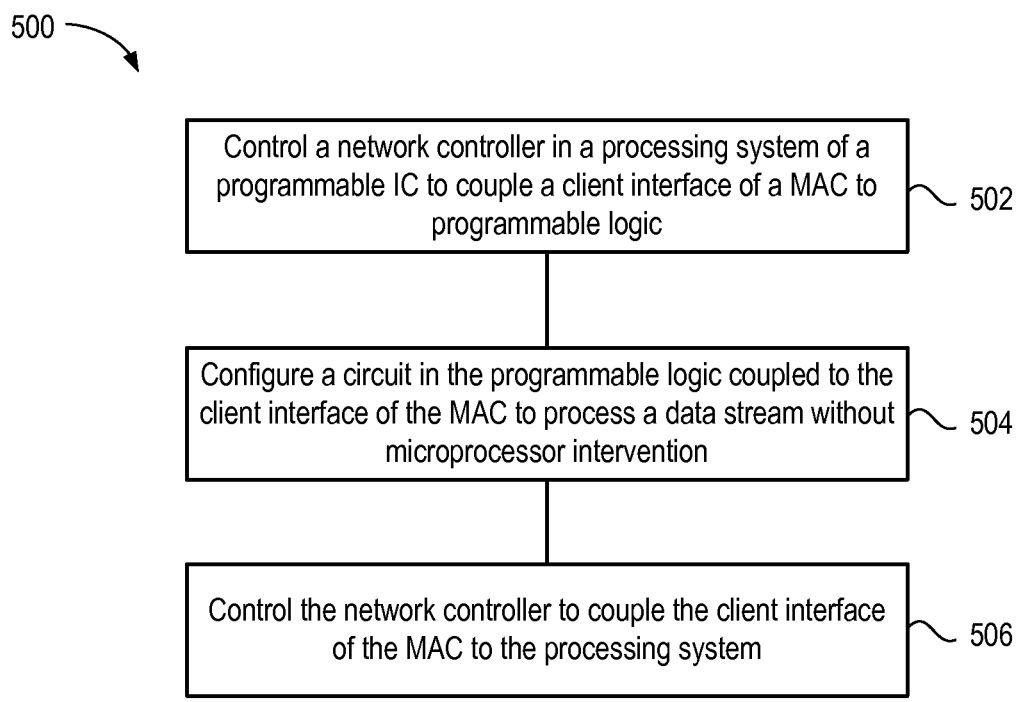
FIG. 5 is a flow diagram depicting an example of a method of operating a network controller peripheral in a processing system of a programmable IC.

FIG. 5 is a flow diagram depicting an example of a method 500 of operating a network controller peripheral in a processing system of a programmable IC. The method 500 begins at step 502, where a network controller in a processing system of a programmable IC is controlled to couple a client interface of a MAC to programmable logic. At step 504, a circuit is configured in the programmable logic coupled to the client interface of the MAC to process a data stream without microprocessor intervention. At step 506, the network controller is controlled to couple the client interface of the MAC to the processing system. For example, the network controller can employ a DMA function to obtain data from a system memory managed by the processing system. The steps of the method 500 do not imply any specific order. Moreover, the some or all of the steps can be performed concurrently, rather than in sequence. That is, the network controller can employ a direct interface to programmable logic, a DMA interface to a processing system, or a combination of both interfaces.

While the foregoing is directed to specific examples, other and further examples may be devised without departing from the basic scope thereof, and the scope thereof is determined by the claims that follow.

What is claimed is:

1. A programmable integrated circuit (IC), comprising:
    programmable logic having a programmable fabric of logic blocks and a programmable interconnect, the programmable interconnect coupled to the programmable fabric;
    a processing system; and
    a network controller having a media access control unit (MAC), a first interface to a physical transceiver, a second interface to the processing system, and a third interface between the MAC and the programmable interconnect of the programmable logic, wherein the third interface of the network controller is coupled to access first data on a client interface of the MAC without intervention by the processing system.

2. The programmable IC of claim 1, wherein the second interface comprises:
    a direct memory access (DMA) controller coupled to a bus in the processing system; and
    a first-in-first-out (FIFO) circuit coupled between the DMA controller and a client interface the MAC.

3. The programmable IC of claim 2, wherein the third interface is coupled to the client interface of the MAC.

4. The programmable IC of claim 3, wherein the first interface comprises a media independent interface (MII) of the MAC.

5. The programmable IC of claim 1, wherein the network controller comprises a time stamp unit having an interface coupled to the MAC and the programmable logic.

6. The programmable IC of claim 1, wherein the processing system comprises:
    at least one microprocessor; and
    a memory interface to a memory;
    wherein the second interface of the network controller is coupled to access second data in the memory, the second data being managed by code executing on the at least one microprocessor.

* * * * *